United States Patent [19]

Robson

[11] 4,055,482
[45] Oct. 25, 1977

[54] HYDROCRACKING PROCESS WITH REJUVENATED CATALYST

[75] Inventor: Harry E. Robson, Baton Rouge, La.

[73] Assignee: Exxon Research & Engineering Co., Linden, N.J.

[21] Appl. No.: 592,120

[22] Filed: July 1, 1975

Related U.S. Application Data

[63] Continuation-in-part of Ser. No. 107,224, Jan. 18, 1971, abandoned.

[51] Int. Cl.² ........................ C10G 13/02; B01J 29/12
[52] U.S. Cl. ..................................... 208/111; 208/140; 252/412; 252/455 Z; 252/466 PT
[58] Field of Search ................ 208/111, 140; 252/412, 252/455 Z

[56] References Cited

U.S. PATENT DOCUMENTS

| 3,210,267 | 10/1965 | Plank et al. | 208/120 |
|---|---|---|---|
| 3,375,065 | 2/1968 | McDaniel et al. | 423/328 |
| 3,449,070 | 6/1969 | McDaniel et al. | 423/328 |
| 3,493,490 | 2/1970 | Plank et al. | 208/120 |
| 3,684,738 | 8/1972 | Chen | 252/412 |
| 3,692,692 | 9/1972 | Ward et al. | 252/412 |
| 3,835,028 | 9/1974 | Ward et al. | 208/111 |

FOREIGN PATENT DOCUMENTS

| 41,646 | 10/1965 | Germany | 252/412 |

*Primary Examiner*—Delbert E. Gantz
*Assistant Examiner*—G. E. Schmitkons
*Attorney, Agent, or Firm*—Roy J. Ott

[57] ABSTRACT

A process for rejuvenating crystalline aluminosilicayte zeolite-containing catalysts which have become at least partially deactivated through use in a hydrocracking process. Used, deactivated catalysts are treated with ion-containing solutions, particularly those containing hydrogen ions and hydrogen precursors, at a pH of from 3.5 to about 9, such that the alkali metal content of the catalyst is substantially reduced to thereby rejuvenate the catalyst to at least its original fresh activity in a hydrocracking process.

10 Claims, 1 Drawing Figure

HYDROCRACKING PROCESS WITH REJUVENATED CATALYST

CROSS REFERENCE TO RELATED APPLICATIONS

This application is a Continuation-In-Part of copending application, Ser. No. 107,224, filed Jan. 18, 1971, and now abandoned.

BACKGROUND OF THE INVENTION

1. Field of the Invention

This invention relates to a novel process for the preparation of certain improved hydrocarbon conversion catalysts. More particularly, the invention relates to the use of crystalline aluminosilicate zeolite-containing catalysts which have been utilized in hydrocarbon conversion reactions and which have lost at least a portion of their initial activity as a starting material for the preparation of such improved hydrocarbon conversion catalysts.

Still more particularly, the present invention relates to the re-use of crystalline aluminosilicate zeolite hydrocracking catalysts which have been rejuvenated.

2. Description of the Prior Art

The catalytic treatment of hydrocarbons, particularly those derived from petroleum feed stocks, has seen great improvement in the past several years. For example, the early clay catalysts were replaced by synthetic, amorphous, alumina or silica-alumina composite catalysts which afforded significant improvements in activity, selectivity, stability and attrition resistance. More recently, however, even further improvements have been made with the introduction of crystalline aluminosilicate zeolites which exhibit very much greater activity and selectivity toward hydrocarbon conversion reactions than the amorphous silica-alumina type catalysts.

Crystalline aluminosilicate zeolites, which are commonly referred to as "molecular sieves", are now well known in the art. They are characterized by their highly ordered crystalline structure and uniformly dimensioned pores, and are distinguishable from each other on the basis of composition, crystalline structure, adsorption properties and the like. The term "molecular sieves" is derived from the ability of these zeolite materials to selectively adsorb molecules on the basis of their size and form. Various types of molecular sieves may be classified according to the size of the molecules which will be rejected (i.e. not adsorbed) by a particular sieve. A number of these zeolite materials are described, for example, in U.S. Pat. Nos. 3,013,982 – 3,013,986, wherein they are characterized by their compositions and X-ray diffraction characteristics. In addition to their extensive use as adsorbents for hydrocarbon separation processes and the like, it has recently been found that crystalline aluminosilicate zeolites, particularly after cation exchange to reduce their initial alkali metal oxide content, are valuable catalytic material for various processes, particularly hydrocarbon conversion processes. The ion exchange of these crystalline aluminosilicate zeolites with various metals and metal ions is described, for example, in U.S. Pat. No. 2,971,904 and U.S. Pat. No. Re. 26,188.

In general, the chemical formula of the anhydrous form of the crystalline aluminosilicate zeolite, expressed in terms of mole ratios of oxides, may be represented as:

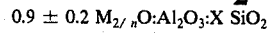

$$0.9 \pm 0.2 \, M_{2/n}O:Al_2O_3:X \, SiO_2$$

wherein "M" is selected from the group consisting of hydrogen, monovalent, divalent, and trivalent metal cations and mixtures thereof; "n" is its valence, and "X" is a number from about 1.5 to about 12, said value dependent upon the particular type of zeolite. The zeolite, as synthetically produced or found naturally, normally contains an alkali metal such as sodium or an alkaline earth metal such as calcium. Among the well-known naturally-occurring zeolites are mordenite, faujasite, chabazite, gmelinite, analcine, erionite, etc. Such zeolites differ in structure, composition, and particularly in the ratio of silica to alumina contained in the crystal lattice structure. Similarly, the various types of synthetic crystalline zeolites, e.g. synthetic faujasite, mordenite, erionite, etc. will also have varying silica-to-alumina ratios depending upon such variables as the composition of the crystallization mixture, reaction conditions, etc. Silica-to-alumina ratios higher than 12, e.g. as high as 90 to 100, can also be achieved through various methods for the removal of alumina from the crystal structure of the zeolite. Such zeolites having these higher silica-to-alumina mole ratios are preferred in hydrocarbon conversion processes because of their high stability at elevated temperatures. Those silica-to-alumina ratios above three are particularly preferred.

The processes for producing such zeolites synthetically are now well known in the art. The crystalline zeolites are prepared by having present in the reaction mixture: $Al_2O_3$ as sodium aluminate, alumina sol and the like; $SiO_2$ as sodium silicate and/or silica gel and/or silica sol; an alkaline hydroxide, e.g., sodium hydroxide, either free or in combination with the above components. Careful control is kept over the alkali concentration of the mixture, as well as the proportions of silica to alumina and soda (metal oxide) to silica, the crystallization period, etc., all in a manner known per se. A general scheme for preparing large pore size (i.e. 6–15A) crystalline aluminosilicate zeolite would be as follows:

Colloidal silica, such as commercial Ludox, is mixed with a solution of sodium hydroxide and sodium aluminate at ambient temperatures. The reaction mixture may be allowed to digest at ambient temperatures for periods of up to 40 hours or more, e.g. 24 hours. The reaction mixture is then heated to 180°–250° F., preferably 200°–220° F., for a period of 24 to 200 hours or more, in order to effect crystallization. The crystalline aluminosilicate is then separated from the aqueous mother liquor by decantation and washed and thus recovered as a crystalline product having a particle size of about 0.05 to 5 microns. Synthetically prepared alumino-silicate zeolites having large effective pore diameters have been termed in the industry as Zeolites "X", "Y", "L", etc.

For use in many commercial operations, e.g. moving or fluidized bed, adsorption or hydrocarbon conversion processes, the difficulty of handling the extremely fine size zeolite crystals has required the use of various "matrices" in conjunction with the zeolites. The use of such matrices is described in U.S. Pat. Nos. 3,140,249 and 3,140,253. The matrix may include various organic and/or inorganic compositions, particularly inorganic oxide gel compositions, including plural gel compositions containing a major amount of silica in conjunction with one or more metal dioxides selected from Groups I-B through VIII of the Periodic Table, particularly such compounds as alumina, magnesia, zirconia, titania, etc. The matrix may also include such compositions as clay materials, particularly kaolin-type clays.

Recently such crystalline aluminosilicate zeolite-containing hydrocarbon conversion catalysts of greatly improved stability have been discovered which contain reduced amounts of alkali metal, such as less than 3%, and preferably less than 1%, e.g. see U.S. Pat. No. 3,449,070.

Typically, these crystalline aluminosilicate zeolite-containing catalysts are utilized in hydrocarbon conversion reactors at various temperatures, generally ranging from about 500° to 800° F. depending on the particular reaction desired, and utilizing various hydrocarbon-containing feedstreams, such as light virgin naphtha, heavy gas oil, catalytic cycle stock, heavy reformate, coker gas oil, etc. These reactors are generally at pressures of from 500 to 2200 psig. During use in these reactors, these zeolite-containing catalysts tend to become deactivated, and are generally cyclically regenerated by high-temperature treatment with an oxygen-containing gas in order to burn off accumulated carbon and to restore some of their lost activity. After such continued use, however, these catalysts have tended to exhibit increasingly lower activities, and eventually must be discarded and replaced by fresh catalyst.

SUMMARY OF THE INVENTION

The invention is directed to a hydrocracking process which comprises contacting a hydrocarbon feedstock in the pressure of hydrogen at hydrocracking conditions of temperature and pressure with a rejuvenated catalyst comprising a crystalline aluminosilicate zeolite and a hydrogenation component, said rejuvenated catalyst (1) having previously become at least partially deactivated after being used in a hydrocracking process including periodic regeneration by contact with an oxygen-containing gas at a temperature within the range of 700° to 1100° F., and (2) having been rejuvenated to at least substantially its original fresh activity by a process which comprises (a) contacting said partially deactivated catalyst with an aqueous solution containing ions selected from the group consisting of hydrogen ions, hydrogen precursor ions and mixtures thereof; (b) washing said catalyst subsequent to said contacting; and (c) calcining said washed catalyst at a temperature within the range of about 50° to 1000° F.

According to the present invention, crystalline aluminosilicate zeolite-containing catalysts which have become at least partially deactivated after use in hydrocarbon conversion processes, such as hydrocracking, may be used to prepare crystalline aluminosilicate zeolite-containing catalysts of substantial activity by treating such used catalysts in a manner such that the residual alkali metal content of said crystalline aluminosilicate zeolite-containing catalysts is reduced by about 0.5 wt. % of the catalyst, or by about 30% of the residual alkali metal originally present. This may be accomplished by treating said crystalline alumino-silicate-containing catalysts with certain ion-exchange solutions, such as solutions containing hydrogen ions or ions easily convertible to hydrogen ions (otherwise known as hydrogen precursors). Such a treatment additionally may be useful in removing ion scale which may have collected on the surface of these catalysts, and in reducing the sulfate content of such catalysts they have been utilized in processes requiring contacting with sulfur-containing feed stocks.

In summary, the process of the present invention comprises ion exchanging an at least partially deactivated crystalline aluminosilicate zeolite-containing catalyst with an ion-containing solution containing ions such as hydrogen ions, or cations which can be easily converted to hydrogen ions, (e.g. ammonium ions, amine ions and the like) in order to prepare an improved catalyst having a reduced residual alkali metal content as compared to said used crystalline aluminosilicate zeolite-containing catalyst of about 0.5 wt. % and preferably about 1.0 wt. %. In a preferred embodiment of the present invention the thus-treated crystalline aluminosilicate zeolite catalysts are then subjected to a calcination procedure prior to their use in hydrocarbon conversion processes. This calcination procedure basically consists of subjecting the ion-exchanged zeolite to temperatures of from about 500° to 1000° F., preferably about 900° to 1000° F., and preferably in dry air.

DESCRIPTION OF THE FIGURE

The FIGURE is a graph of the relative activity of several reactivated catalysts as compared to fresh catalyst and to used-deactivated catalyst.

DETAILED DESCRIPTION

Figure 1:
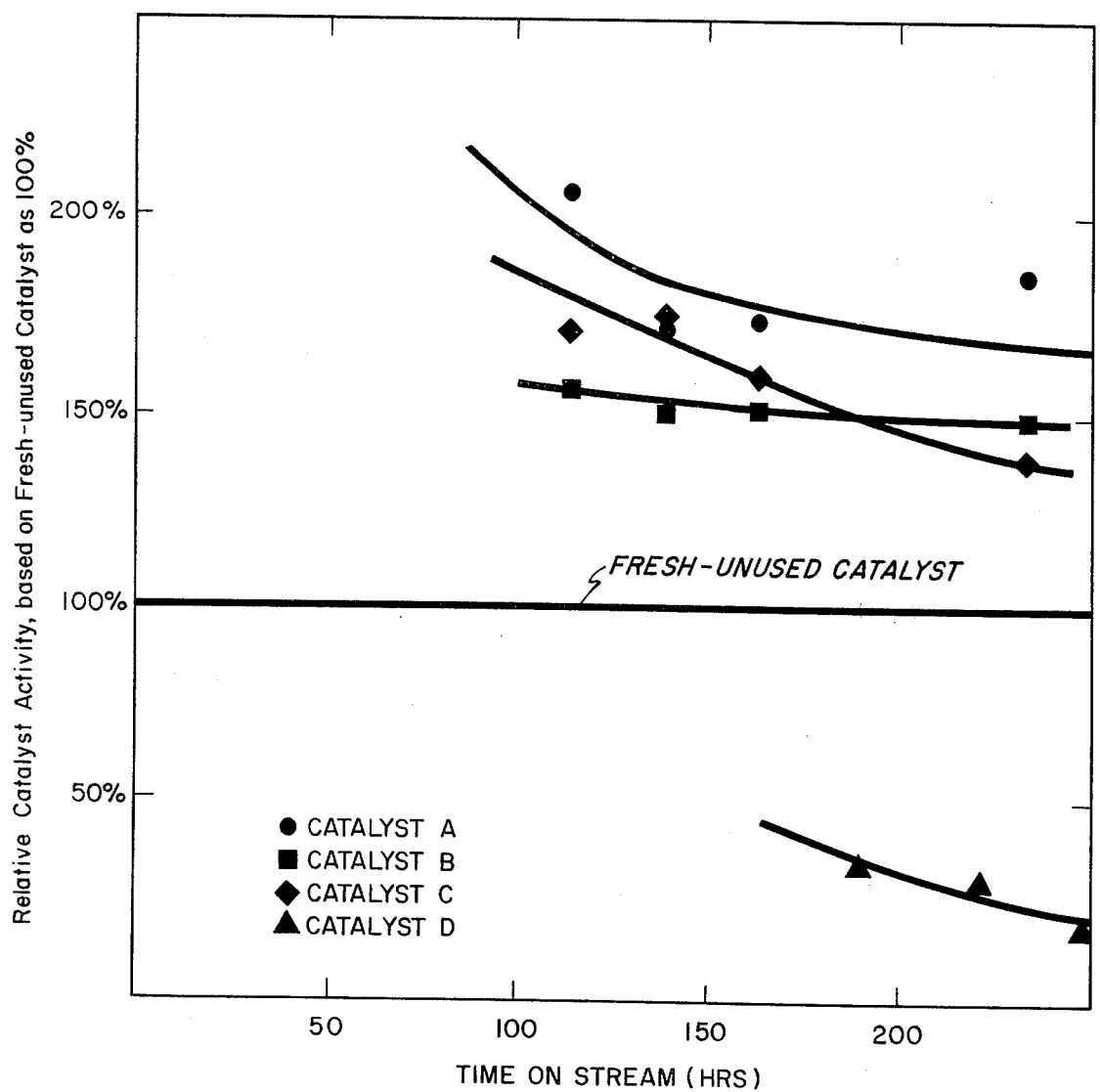

In general, hydrocarbon conversion catalysts, prior to any deactivation, i.e. prior to any use in hydrocarbon conversion processes, are crystalline aluminosilicate zeolite-containing catalysts. That is, they are hydrocarbon conversion catalysts which contain at least a minor amount of a crystalline aluminosilicate zeolite which has been so treated as to make it useful for the conversion of hydrocarbons. These catalysts will generally contain between about 20 and 90 wt. % crystalline aluminosilicate zeolite, and preferably from 50 to 80 wt. % zeolite. In addition to the zeolite component, these catalysts may be embedded in, or admixed with, a matrix containing the aforedescribed porous materials, particularly inorganic oxide gels. The most preferred inorganic oxide gel component will be alumina. In addition, the matrix may include a clay material, and preferably from 0 to 20 wt. % kaolin. Also, combinations of these materials are also desirable in these catalyst compositions. In general, however, a variety of other materials, some possessing catalytic activity of their own, and some merely acting in an inert manner, may be employed, including such materials as silica-alumina, silica, halloysite, etc.

The crystalline aluminosilicate zeolite component of these catalysts may be any one or more of any of those zeolites encompassed by the general formula set forth above. The zeolite component may be prepared by any of the methods known in the prior art. The preferred zeolite components will be those having a high silica-to-alumina mole ratio, i.e., those having a silica-to-alumina mole ratio greater than about 3. This will include both synthetic and natural faujasite and mordenite. Synthetic faujasite having a silica-to-alumina mole ratio above 3 is the most preferred zeolite species. In general, crystalline zeolites having uniform pore openings ranging from 6 to about 15 Angstroms will be used in the catalysts of this invention; however, the use of smaller pore-size zeolites is also contemplated, such as zeolites having uniform pores of about 5 Angstroms. For use as a hydrocarbon conversion catalyst it is usually necessary to reduce the alkali metal content of the crystalline aluminosilicate zeolites to less than about 10 wt. %, preferably substantially less than about 10 wt. %, e.g., less than about 5 wt. %, or most preferably from about 1 to 3 wt. %, since alkali metal oxides are normally undesirable catalyst components for the desired hydrocarbon conversion reactions. This required reduction may be accomplished by exchange with any one or more of the cations of metals selected from Groups I-B through Group VIII of the Periodic Table of the elements, as well as hydrogen cations and hydrogen precursors capable of conversion to hydrogen cations, such as ammonium ions, etc. The preferred cations are those selected from the group consisting of rare earth metals, calcium, magnesium, hydrogen, ammonium, etc. It will, however, be appreciated that mixtures of these and other ions may be utilized, the basic prerequisite being that the initial hydrocarbon conversion catalyst contain at least a minor proportion of the crystalline aluminosilicate zeolite component, which zeolite component has further had its alkali metal content reduced by exchange with one or more of these other ions.

For use in hydrocracking, the crystalline aluminosilicate zeolite-containing catalysts of the invention are preferably combined, in accordance with well-known techniques, with a hydrogenation component such as a metal selected from Groups VIB and VIII of the Periodic Table. Examples of suitable hydrogenating metals include, among others, nickel, tungsten, molybdenum, cobalt, platinum, palladium, rhenium including the oxides and sulfides thereof. Mixtures of any two or more of such hydrogenating components may also be employed. The amount of each hydrogenating metal will generally range between 0.01 to 20% by weight based on the total weight of the catalyst.

The deactivated catalyst which is rejuvenated in accordance with the present invention is one that has preferably been used in a hydrocracking process. Basically, the hydrocracking processes involve contacting a crystalline aluminosilicate zeolite catalyst containing one or more of the aforementioned hydrogenation components with a hydrocarbon-containing feedstock, preferably petroleum-derived feedstocks such as heavy gas oils. Preferred feedstocks include virgin gas oil, catalytic cycle oil, coker gas oil, heavy reformate, light virgin naphtha, etc. In general, the feedstock will by hydrocracked at a temperature in the range of about 500° F. to 950° F., a pressure of 200 to 2000 psig, a liquid hourly space velocity of from 0.1 to 20, preferably 0.5 to 5, V/V/Hr. and a hydrogen rate of about 500 to 10,000 scf/bbl. of feed.

After use in a hydrocarbon conversion process, the crystalline aluminosilicate zeolite-containing catalyst tends to become deactivated after prolonged contact with the hydrocarbon feedstock, basically due to the buildup of carbon on the zeolite. Therefore, generally these zeolite-containing catalysts are periodically regenerated. This regeneration is typically accomplished by subjecting these catalysts to an oxygen-containing gas at high temperatures of from about 700° to 1100° F. in order to burn off these carbon deposits. The catalysts are then returned to service. Over long periods of time, generally from 50 to 1000 days, these crystalline aluminosilicate zeolite-containing catalysts demonstrate an overall decrease in activity. Usually after such time the initial activity has decreased by a factor of about two, and sometimes by a factor of ten or more. This is usually observed as a failure of the catalyst after regeneration to give the activity expected of a fresh, carbon-free catalyst. In addition, it has also been observed that after such utilization, these catalysts are found to contain iron scale on their catalytic surfaces, and also where these catalysts have been utilized in processes which employ sulfur-containing feedstocks, these catalysts demonstrate an increased sulfate content.

It has heretofore been found necessary to discard these partially deactivated catalysts and replace them with fresh or new catalysts. It has now been found that these partially deactivated crystalline aluminosilicate zeolite-containing catalysts may be employed to prepare catalysts of improved activity which are suitable for use in hydrocarbon conversion processes. Initially, the process of the present invention requires that the deactivated catalysts, preferably in the regenerated, substantially carbon-free form, be contacted with an ion-containing solution containing ions such as hydrogen ions or ions easily convertible to hydrogen ions (also known as hydrogen precursors), such as ammonium ions, etc. An extensive list of such hydrogen or hydrogen-containing compounds may be found in U.S. Pat. No. 3,140,251. The preferred hydrogen precursor ion will be ammonium ion, and may be supplied by use of various ammonium salts, particularly ammonium nitrate, ammonium sulfate, ammonium chloride, etc. This contact is carried out at a pH of from about 3.5 to about 9, preferably about 4.5 to less than about 7.0, and most preferably from about 4.5 to about 6.5, and at temperatures of from room temperature to about 100° C., preferably at room temperature. This exchange treatment may be carried out in a single step, or in a series of exchanges, including up to about five exchanges, until the residual alkali metal content of the used and deactivated catalyst has been reduced by about $\Delta$ to about $\frac{2}{3}$ of the residual alkali present, preferably 0.5 to 1.5 wt. % (based upon zeolite component of the catalyst), or until the residual alkali metal content of the zeolite component has been reduced to below about 1.0 wt %, preferably below about 0.5 wt %. This treatment also removes substantially all, and preferably at least about 90%, of the iron scale which has accumulated on the surface of the catalyst particules during these hydrocarbon conversion reactions. In addition, it substantially reduces the sulfate content (which deposits on the catalyst as the sulfide when contacted with sulfur-containing feeds and is converted to the sulfate during regeneration). Thus at least about 40%, and up to about 80% of this accumulated sulfate may be so removed.

After the exchange treatment, the catalyst is washed until substantially free of the exchange acid or salt. The exchange should be carried out in such a manner as to minimize the removal of any metallic hydrogenation component present, and to minimize loss of the crushing strength of these catalyst particles. This requires minimum exposure to high temperature and strong oxidizing acid. Preferably, the catalyst prepared according to the present process will contain at least about 90% of any hydrogenation component contained in the fresh catalyst and will be rejuvenated to greater than its original fresh activity.

The exchanged catalyst will then be dried, and preferably will then be subjected to a calcination procedure. This calcination procedure will basically consist of contacting the thus-treated crystalline aluminosilicate zeolite-containing catalyst with dry air at high temperatures, by heat-treating the zeolite for a period of from about 1 to 24 hours, preferably 4 to 8 hours, at temperatures of from 300° to 1000° F., and preferably the temperature is increased gradually to 1000° F., while sweeping the catalyst with dry air. This calcination procedure will be carried out in the presence of a treating gas, such as air, nitrogen, inert gases, etc. In addition, calcination may be carried out in a series of stages, with increasing temperatures at each stage for various periods of time. Specifically, this may be done in a series of from two to eight steps, increasing the temperature at increments of from 100° F. to 400° F. until a temperature of from 950° to 1000° F. is finally attained. The final catalyst is then cooled and it is ready for use in hydrocarbon conversion processes as described herein.

DESCRIPTION OF THE PREFERRED EMBODIMENTS

EXAMPLE 1

A crystalline aluminosilicate zeolite-containing catalyst was initially prepared as follows:

A synthetic faujasite having a silica-to-alumina mole ratio of 4.9 was base-exchanged with ammonium ions by the use of a solution of $NH_4NO_3$, and further base-exchanged with magnesium ions by the use of an $Mg(NO_3)_2$ solution so that it had an alkali metal content of 1.5 wt. %, and an MgO content of 3.0 wt. %. It was additionally admixed with an alumina binder so that the catalyst had a composition of 20% alumina and 80% zeolite component. Finally, the catalyst was impregnated with 0.5% palladium by the use of $Pd(NH_3)_4Cl_2$. The catalyst was washed, dried, formed into ⅛ inch pills and calcined at 1000° F. This catalyst was employed for the hydrocracking of hydrocarbons in a reactor at about 700° F. and under a pressure of 1500 psig for a period of about 1000 days. It was additionally cyclically regenerated by carbon burnoff at a temperature of 700° to 900° F., and an atmosphere of inert ±0.5 to 3% oxygen at 100 psig. After the above period the catalyst had been substantially deactivated such that a temperature increase of about 24° F. was required in order to obtain the same conversions as with the original catalyst. Thus, the catalyst had been deactivated by about 53% of its initial activity.

The above catalyst was then withdrawn from the hydrocracking reactor and slurried with 10% ammonium nitrate solution at a pH of 4.5. This exchange was carried out at room temperature and a single exchange was employed. The catalyst thus prepared contained a reduced residual alkali metal content of 0.6 wt. %, based on the zeolite component, and thus had undergone a reduction in its residual alkali metal component of about 50%.

This catalyst was then calcined in dry air for 16 hours at 300° F., and then the temperature was increased at increments of 100° F./hour until a temperature of 1000° F. was obtained, and the calcination was continued for an additional 16 hours at that temperature.

The resultant catalyst had a substantially increased activity, such that a temperature of about 17° F. less than with the original catalyst was required in order to obtain the same conversion. Thus, as compared to the deactivated catalyst as withdrawn from the hydrocracking reactor, a dramatic increase in activity of about 500% was observed.

EXAMPLE 2

A hydrocracking catalyst was prepared according to the initial procedure of Example 1, containing 20 wt. % of an alumina binder material, and 3.0 wt. % MgO, 1.6 wt. % $Na_2O$, 0.5 wt. % Pd, and having a silica to alumina mole ratio of 4.9. This fresh-unused catalyst was employed for the hydrocracking of a feed stream having the following analysis:

| | |
|---|---|
| Bromine No. | 0.3 |
| Gravity, ° API | 35.8 |
| Aniline Point, ° F. | 158.0 |
| Pour Point, ° F. | −20.0 |
| Refractive Index at 67° C. | 1.4437 |
| Carbon, wt. % | 86.25 |
| Hydrogen, wt. % | 13.71 |
| Viscosity at 210° F., c.s. | 1.13 |
| Viscosity at 100° F., c.s. | 2.73 |
| Nickel, ppm | <1.0 |
| Vanadium, ppm | <1.0 |
| Initial Boiling Point, ° F. | 374 |
| 5% | 430 |
| 10% | 450 |
| 20% | 468 |
| 30% | 478 |
| 40% | 488 |
| 50% | 500 |
| 60% | 514 |
| 70% | 530 |
| 80% | 545 |
| 90% | 576 |
| 95% | 592 |
| Final Boiling Point, ° F. | 616 |
| Aromatics, Vol. % | 5.3 |
| Olefins, Vol. % | 0.8 |
| Saturates, Vol. % | 93.9 |

The feed also contained 10,000 ppm sulfur and 1,000 ppm nitrogen.

The reaction was carried out at a temperature of 700° F., a pressure of 1500 psig, a feed rate of 1 V/V/Hr. and hydrogen gas was added at a rate of about 8,000 SCF/B.

The results of the reaction were a conversion of 52% after 235 hours on stream.

These results were then compared with those obtained utilizing the same catalyst, but now after it had been utilized in such a reaction form about 1000 days, with cyclic regeneration as in Example 1, and then the used catalysts were treated according to the process of the present invention to prepare catalysts A, B and C, as follows:

Catalyst A was prepared by slurrying the used-deactivated catalyst with 10% ammonium nitrate solution at a pH of about 4.5, at room temperature, and using a series of three exchanges. Catalyst A had an alkali metal content ($Na_2O$) of 0.74 wt. %.

Catalyst B was prepared by slurrying the used-deactivated catalyst with 10% ammonium nitrate solution at a pH of about 4.5, at 180° F., and using a series of three exchanges. Catalyst B had an alkali metal content of 0.65 wt. %.

Catalyst C was prepared by slurrying the used-deactivated catalyst with 20% ammonium nitrate solution at a pH of about 4.5, at room temperature, and using a single exchange. Catalyst C had an alkali metal content of 0.86 wt. %.

Catalyst D was the used-deactivated catalyst without any such treatment with ammonium nitrate solution, but which had been regenerated by the standard method herein described. Catalysts A, B, C and D were then utilized for the hydrocracking of the above-described feedstock at the same conditions, and conversions of 77%, 70% and 66% were obtained with catalysts A, B and C, respectively. The activity of each of these catalysts is plotted in the drawing, relative to that obtained with the fresh-unused catalyst, under the same conditions. Each of these catalysts not only demonstrated an improved activity as compared to the fresh-unused catalysts after being treated by the process of the present invention, but quite unexpectedly demonstrated an activity dramatically superior to that of the fresh-unused catalyst.

On an absolute basis, Catalyst A was capable of producing the same conversion as the fresh catalyst at a temperature 17° F. lower, or an 89% increase in activity.

Catalyst B was capable of producing the same conversion as the fresh catalyst at a temperature 12° F. lower, or a 66% increase in activity, and Catalyst C was capable of producing the same conversion as the fresh catalyst at a temperature 13° F. lower, or a 72% increase in activity.

Catalyst D, on the other hand, which was not subjected to treatment according to the present invention, when utilized for the hydrocracking of the above-described feedstock, at the same conditions, showed a conversion of about 36%. The activity of this catalyst is also plotted in the drawing. Again, on an absolute basis, Catalyst D was capable of producing the same conversion as the fresh catalyst at a temperature about 38° F. higher, or a 43% decrease in activity.

Thus, each of the treated catalysts A, B and C demonstrates remarkable increases in activity when compared with the untreated, regenerated catalyst D.

What is claimed is:

1. A hydrocracking process which comprises contacting a hydrocarbon feedstock in the presence of hydrogen at hydrocracking conditions of temperature and pressure with a rejuvenated catalyst comprising a synthetic faujasite zeolite and a hydrogenation component, said rejuvenated catalyst (1) having previously become at least partially deactivated after being used in a hydrocracking process including periodic regeneration by contact with an oxygen-containing gas at a temperature within the range of 700° to 1100° F., and (2) having been rejuvenated to at least substantially its original fresh activity by an aqueous treating process restricted to a pH less than about 7.0, said catalyst being rejuvenated by (a) treating said partially deactivated catalyst with an aqueous solution containing ions selected from the group consisting of hydrogen ions, hydrogen precursor ions and mixtures thereof so that the alkali metal content of the zeolite component is less than the amount of alkali metal originally present in said catalyst prior to said treatment with aqueous solution; (b) washing said catalyst subsequent to said contacting; and (c) calcining said washed catalyst at a temperature within the range of about 50° to 1000° F.

2. The process of claim 1 wherein said aqueous solution comprises ammonium ions.

3. The process of claim 2 wherein said contacting of the partially deactivated catalyst is carried out at a pH of from about 4.5 to about 6.5.

4. The process of claim 3 wherein said solution comprises a solution of ammonium nitrate.

5. The process of claim 4 wherein said metallic hydrogenation component comprises palladium.

6. A hydrocracking process which comprises contacting a hydrocarbon feedstock in the presence of hydrogen at hydrocracking conditions of temperature and pressure with a rejuvenated catalyst comprising a synthetic faujasite zeolite and a hydrogenation component, said rejuvenated catalyst (1) having previously become at least partially deactivated after being used in a hydrocracking process including periodic regeneration by contact with an oxygen-containing gas at a temperature within the range of 700° to 1100° F., and (2) having been rejuvenated to greater than its original fresh activity by an aqueous treating process restricted to a pH less than about 7.0, said catalyst being rejuvenated by (a) treating said partially deactivated catalyst with an aqueous solution containing ions selected from the group consisting of hydrogen ions, hydrogen precursor ions and mixtures thereof, to reduce the alkali metal content of said catalyst by at least about 30%; (b) washing said catalyst subsequent to said contacting; and (c) calcining said washed catalyst at a temperature within the range of about 50° to 1000° F.

7. The process of claim 6 wherein said solution comprises ammonium ions.

8. The process of claim 7 wherein said contacting of the partially deactivated catalyst is carried out at a pH of about 4.5 to about 6.5.

9. The process of claim 8 wherein said solution comprises a solution of ammonium nitrate.

10. The process of claim 9 wherein said metallic hydrogenation component comprises palladium.

* * * * *